B. A. BERRYMAN.
Sash-Fastener.

No. 166,842.

Patented Aug. 17, 1875.

ATTEST:
Robert Burns.
Henry Farmer.

INVENTOR:
Bayard A. Berryman
By Knight ___ Attorney

UNITED STATES PATENT OFFICE.

BAYARD A. BERRYMAN, OF ST. LOUIS, MISSOURI, ASSIGNOR OF ONE-HALF HIS RIGHT TO GEORGE W. SHAW, OF SAME PLACE.

IMPROVEMENT IN SASH-FASTENERS.

Specification forming part of Letters Patent No. 166,842, dated August 17, 1875; application filed September 29, 1874.

*To all whom it may concern:*

Be it known that I, BAYARD A. BERRYMAN, of St. Louis, in the county of St. Louis and State of Missouri, have invented a new and useful Improvement in Sash-Fasteners, of which the following is a specification:

My improvement relates to a peculiar device for operating the bolts which work horizontally in the lower or some other horizontal bar of a sash.

The improvement consists in an S-shaped cross-bar, having springs which are attached to and lap around the curved surface of the same. The bolts are attached to each end of the bar, respectively. The center of the cross-bar is attached to the shank of a turn-knob. By turning the knob to draw the bolts the power of the spring is increased as the bolts are drawn back, so that, though a slight retraction is not difficult, yet the bolts will always be forced out with sufficient power at the incipience of their outward stroke; and this is just the time when the power is required—that is, when the parts are at rest—for when the movement is commenced a very slight power will complete it. The points are gained by the peculiar form of the cross-bar where the springs wrap around the curved surfaces as the bolts are retracted.

Figure 1:
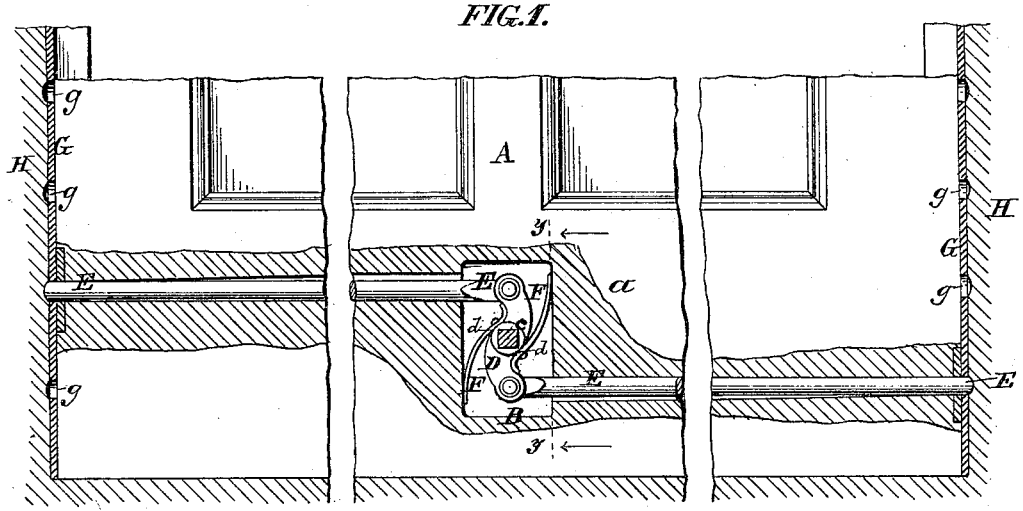
Figure 2:
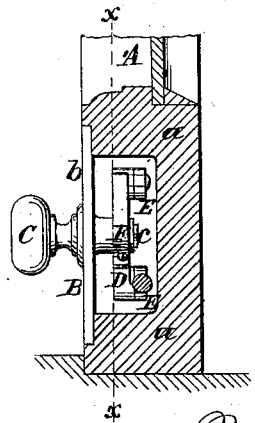

In the accompanying drawings, Figure 1 is a section on the line $x\,x$, Fig. 2, showing the improved cross-bar and its springs as applied to a sash. Fig. 2 is a section on the line $y\,y$, Fig. 1.

A represents the lower portion of a window-sash. In the middle of the bottom bar $a$ is inserted a metallic case, B. D represents the improved cross-bar of S form. F F represent the springs which are attached to the curved surfaces $d\,d$ of the cross-bar. The free ends of said springs bear against the sides of the case B, and, when the cross-bar is turned, lap around the ends of said cross-bar. To the ends of the cross-bar are attached the bolts E E, which enter recesses $g\,g$ in the metallic bars G, attached to the frame or stiles H. An outer plate, $b$, forms a bearing for the shank $c$ of a turn-knob, C, by which the fastening is operated. The peculiar advantage of this form of cross-bar is, that it admits of the springs F F being attached thereto, and also forms a bearing for the free ends of the springs. The springs lap around the curved surface as the bolts E E are drawn back, and the power of the spring is increased as the bolts are drawn back, so that, though a slight retraction is not difficult, yet the bolts will always be forced out with a sufficient power at the commencement of their outward stroke, and this is just the time the power is required—that is, when the parts are at rest—for when the movement is commenced a very slight power will complete it.

It will be seen that this device is very compact and can be cheaply made, and its parts are nicely balanced.

The following is claimed as new:

The S-shaped bar D, in combination with the springs F F, when said springs are secured to the curved surfaces $d\,d$ of the bar D, so that the power of the springs will be increased as the bolts E E are retracted, as and for the purpose set forth.

BAYARD A. BERRYMAN.

Witnesses:
WALTER ALLEN,
HENRY TANNER.